March 23, 1948. S. G. HIRSCH 2,438,440
SPOOL FOR FISHING REELS
Filed April 17, 1946
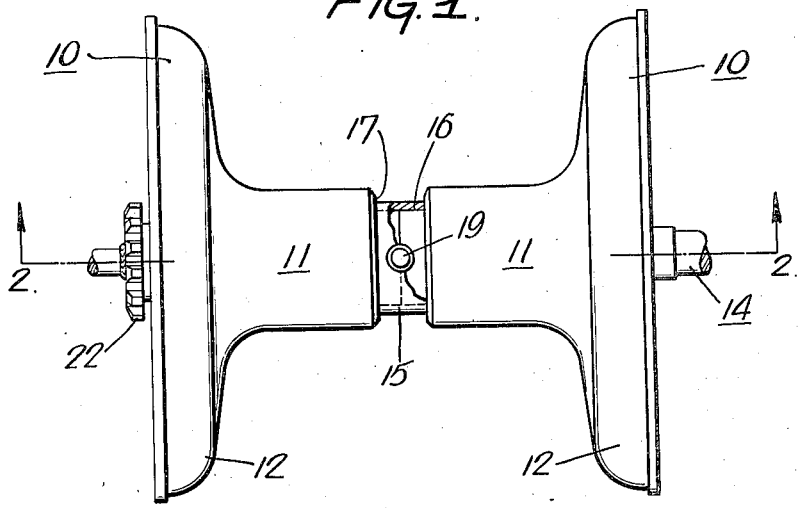
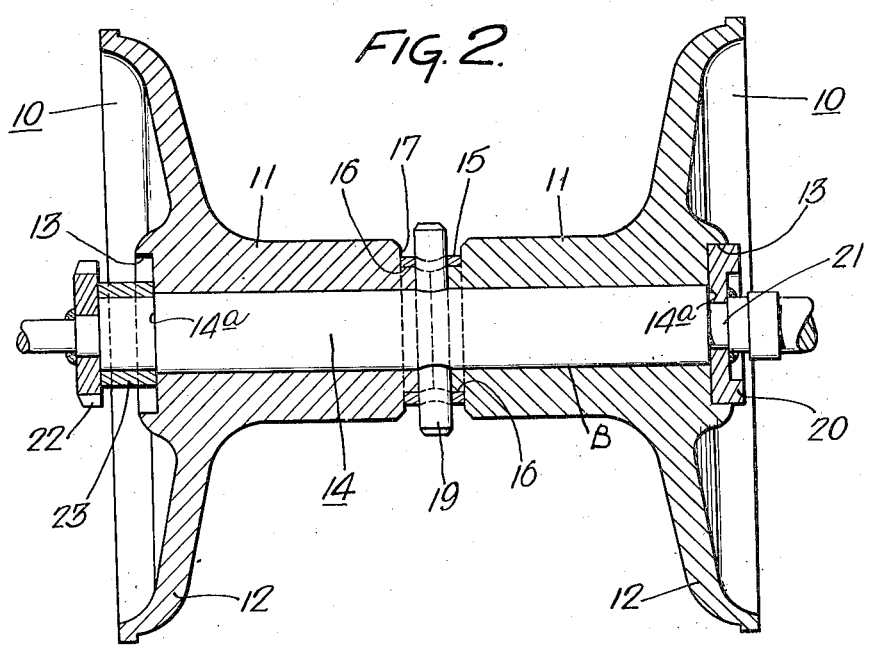
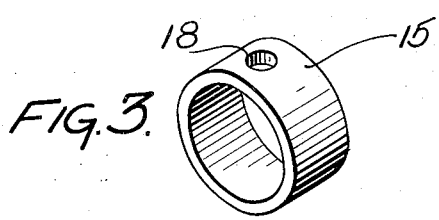
Inventor:
Stephen G. Hirsch
by his Attorneys
Howson & Howson Patented Mar. 23, 1948

2,438,440

UNITED STATES PATENT OFFICE 2,438,440

SPOOL FOR FISHING REELS

Stephen G. Hirsch, Philadelphia, Pa., assignor to Ocean City Manufacturing Company, Philadelphia, Pa., a corporation of Pennsylvania Application April 17, 1946, Serial No. 662,829

4 Claims. (Cl. 242—118)

This invention relates to a spool for fishing reels and more particularly to a means for cheaply constructing reel spools in which the spool body and its flanges are formed of Bakelite or similar material.

A more specific object of the invention is the provision of a construction of this character enabling the reel body to be cast in two identical sections and assembled in a fashion insuring the integrity of their relative positions.

Another and more specific object of the invention is a reel body and spindle assembly which can be readily and cheaply produced and which will be pleasing in appearance and durable and efficient in service.

These and other objects I attain by the construction shown in the accompanying drawings wherein:

Fig. 1 is a plan view partially broken away of a fishing reel spool constructed in accordance with my invention;

Fig. 2 is an enlarged sectional view therethrough taken on line 2—2 of Fig. 1; and Fig. 3 is a perspective view of the connecting sleeve.

Referring now more particularly to the drawings, the numeral 10 designates either of two identical spool elements each comprising a spool body 11 and a flange 12 and having an axial bore B. The flanges 12 are recessed about their hub portions as at 13 for purposes presently to appear. In assembly, two such elements are assembled upon a spindle 14, a sleeve 15 preferably of stainless steel being interposed between the elements and embracing the adjacent ends thereof with a good friction fit. Preferably, the inner ends of the elements are reduced as at 16 thus providing in the completed structure a groove 17 in which the band 15 is disposed. The band which is illustrated in Fig. 3 is preferably preformed with a single opening 18. Using this opening as a guide, the meeting ends of the elements 10, the spindle 14 and the opposite side of ring 15 are drilled with a diametral opening which, in the case of the elements 11, notches the meeting ends thereof and a pin 19 is drive-fitted in the opening thus formed.

This pin serves the double function of insuring against any possible relative rotation of the elements 10 thereby eliminating the necessity for tightly fitting these elements and that of providing through its extended ends an anchor point for the line to be wound on the spool. The line may be engaged with either end of this pin by forming a loop on the end of the line and thus provides a connection insuring against loss of the fishing rig as an entirety when, as occasionally happens, a fish is hooked too heavy for the rig and accordingly strips the line from the reel.

To prevent endwise movement of the sections 10, the clutch element 20 employed in connecting the spool to the usual handle-actuated gear train (not shown) is mounted upon a reduced end portion 21 of the spindle body at one end of the spool and rolled or otherwise secured in position thereon. At the opposite end of the spool the ordinary click ratchet 22 may be similarly secured to the spindle and engaged with the adjacent element 10 to prevent axial movement thereof. As shown, engagement of either of these elements with the associated spool element 10 need not be direct and may be through use of an interposed sleeve 23. The spindle 14 is provided with shoulders 14a to be engaged by the spindle fittings simultaneously with their engagement with the ends of sections 10 thereby securely positioning the completed spool. The construction illustrated is not only capable of rapid assembly and economical manufacture but presents an extremely pleasing appearance to the eye and as noted above, incorporates in the reel a safety feature which is not feasible in the ordinary spool construction.

Since the specific arrangement herein illustrated and described is capable of considerable modification, I do not wish to be understood as limiting myself thereto except as hereinafter claimed.

I claim:

1. In a spool and shaft assembly for fishing reels, a spool shaft, a spool mounted on the shaft and comprising identical end sections each having a body portion slidably engaged with the shaft and having a flange at its outer end, a narrow sleeve embracing adjacent ends of the bodies of the sections and concealing the junction thereof, spool fittings fixed to the shaft and having engagement with the ends of the spool preventing axial movement thereof, and a pin having engagement with said sleeve end sections and shaft preventing relative rotation thereof.

2. In a spool and shaft assembly for fishing reels, a spool shaft, a spool mounted on the shaft and comprising identical end sections each having a body portion slidably engaged with the shaft and having a flange at its outer end, a narrow sleeve embracing adjacent ends of the bodies of the sections and concealing the junction thereof, spool fittings fixed to the shaft and having engagement with the ends of the spool preventing axial movement thereof, a pin having engagement with said sleeve end sections and shaft preventing relative rotation thereof, and ends of said pin projecting beyond the periphery of the sleeve and forming a line attaching means.

3. In a spool and shaft assembly for fishing reels, a spool shaft, a spool mounted on the shaft and comprising identical end sections each having a body portion slidably engageable with the shaft and having a flange at its outer end, the inner ends of said bodies having reduced portions, a narrow sleeve embracing the reduced portions of the bodies of the sections and concealing the junction thereof, shaft fittings fixed to the shaft and having engagement with the ends of the spool preventing axial movement thereof, and a pin having engagement with said sleeve end sections and shaft preventing relative rotation thereof.

4. In a spool and shaft assembly for fishing reels, a spool shaft, a spool mounted on the shaft and comprising identical end sections each having a body portion slidably engageable with the shaft and having a flange at its outer end, the inner ends of said bodies having reduced portions, a narrow sleeve embracing the reduced portions of the bodies of the sections and concealing the junction thereof, shaft fittings fixed to the shaft and having engagement with the ends of the spool preventing axial movement thereof, a pin having engagement with said sleeve end sections and shaft preventing relative rotation thereof, and ends of said pin projecting beyond the periphery of the sleeve and forming a line attaching means.

STEPHEN G. HIRSCH.

REFERENCES CITED

The following references are of record in the file of this patent:

UNITED STATES PATENTS

| Number | Name | Date |
| --- | --- | --- |
| 1,683,273 | Wanders | Sept. 4, 1928 |
| 1,697,850 | Case | Jan. 8, 1929 |
| 2,150,083 | White | Mar. 7, 1939 |
| 2,309,146 | Whistler | Jan. 26, 1943 |

FOREIGN PATENTS

| Number | Country | Date |
| --- | --- | --- |
| 4,619 | Great Britain | Jan. 6, 1894 |
| 475,198 | Germany | Apr. 19, 1929 |